(12) United States Patent
Ferro et al.

(10) Patent No.: US 11,703,440 B2
(45) Date of Patent: Jul. 18, 2023

(54) POROSITY OF A PART

(71) Applicant: General Electric Company, Schenectady, NY (US)

(72) Inventors: Andrew Frank Ferro, West Chester, OH (US); Christopher Michael Meier, Waynesville, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/484,458

(22) Filed: Sep. 24, 2021

(65) Prior Publication Data

US 2023/0099769 A1   Mar. 30, 2023

(51) Int. Cl.
*G01N 15/08* (2006.01)
*G01N 23/046* (2018.01)

(52) U.S. Cl.
CPC ......... *G01N 15/088* (2013.01); *G01N 23/046* (2013.01); *G01N 2015/0846* (2013.01); *G01N 2223/419* (2013.01); *G01N 2223/649* (2013.01)

(58) Field of Classification Search
CPC ............... G01N 15/088; G01N 23/046; G01N 2015/0846; G01N 2223/419; G01N 2223/649
See application file for complete search history.

(56) References Cited

U.S. PATENT DOCUMENTS

| | | | |
|---|---|---|---|
| 7,549,789 B2 | 6/2009 | Tralshawala et al. | |
| 8,826,740 B2 | 9/2014 | Bergman | |
| 9,002,088 B2 | 4/2015 | Ferguson | |
| 10,203,290 B2 | 2/2019 | Ferro et al. | |
| 2013/0262028 A1 | 10/2013 | De Prisco et al. | |
| 2016/0305895 A1* | 10/2016 | Ferro | G06T 7/00 |
| 2020/0331206 A1 | 10/2020 | Morovic et al. | |

FOREIGN PATENT DOCUMENTS

| | | |
|---|---|---|
| CN | 110674589 A | 1/2020 |
| CN | 111272625 A | 6/2020 |
| CN | 1117512559 A | 10/2020 |
| EP | 1421559 B1 | 3/2006 |
| WO | WO2018/022000 A1 | 2/2018 |
| WO | WO2018/104683 A1 | 6/2018 |

OTHER PUBLICATIONS

Hermanek et al., "Rerference object for evaluating the accuracy of porosity measurement by X-ray computed tomography", Case Studies In Nondestructive Testing And Evaluation, vol. 6, Nov. 2016, pp. 122-127.

(Continued)

*Primary Examiner* — David P Porta
*Assistant Examiner* — Mamadou Faye
(74) *Attorney, Agent, or Firm* — Dority & Manning, P.A.

(57) ABSTRACT

A method for determining porosity of a part is provided. The method includes: determining scan data of the part, the scan data including data of a plurality of sequential segments; determining a background model for the part, the scan data, or both; and determining a bulk porosity based on a difference between the scan data and the background model.

20 Claims, 5 Drawing Sheets

(56) References Cited

OTHER PUBLICATIONS

Nikishov et al., "Measurement of voids in composites by X-ray Computed Tomography", Composites Science And Technology, vol. 89, Dec. 2013, pp. 89-97.
Slotwinski et al., "Porosity Measurements and Analysis for Metal Additive Manufacturing Process Control", Journal Of Research Of The National Institute Of Standards And Technology, vol. 119, Oct. 2014, pp. 494-528.
Ziólkowski et al., "Application of X-ray CT method for discontinuity and porosity detection in 316L stainless steel parts produced with SLM technology", Archives of Civil and Mechanical Engineering, vol. 14, No. 4, Aug. 2014, pp. 608-614.

\* cited by examiner

POROSITY OF A PART

FIELD

The present disclosure relates to a non-destructive method for determining a bulk porosity of a part, such as of a composite part for a gas turbine engine.

BACKGROUND

Industrial inspection increasingly is being performed using three-dimensional (3D) volumes. A volumetric computed tomography (VCT) scan may be performed, e.g., on a composite aircraft part under inspection, to generate a 3D stack, or "volume," of 2D images, or "slices," of the part. A human operator then may individually review each 2D slide to identify indication of defects typically found in composite parts, such as porosity issues.

Slice-by-slice 2D inspection of a 3D model can be time consuming, laborious and/or error prone. The operator may be required to review a large number of 2D slices of the 3D volume, alone and in relation to each other, in order to determine whether there are defects in the entire volume. For example, the operator may be required to observe subtle changes in grayscale occurring over multiple 2D images. This process is time consuming, tedious and error prone. It is also likely that the analysis will vary greatly across operators, as well as between stages of an operator's shift, e.g., due to operator fatigue.

Previous attempts to automate aspects of defect indication detection have had various problems. For instance, to reduce beam hardening and scattering artifacts, pixels or voxels of a 3D volume of a part have been "normalized" to a "standard," e.g., an aluminum rod. However, adding a rod to the field of view may degrade the images, and this approach only works with linear computed tomography (CT) scans, not VCT. Moreover, this approach requires little or no geometric variance between the shape of the part and the shape of the standard.

Attempts to automate the inspection process have resulted in programs that estimate porosities much higher than the actual porosity, due at least in part to the resolution of the VCT scans being lower than the size of the pores in the part. Such may result in the discarding of parts that have acceptable levels of porosity.

In view of the aforementioned challenges and issues, an improved automated or partially automated system and method for determining a porosity of a part would be welcomed.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
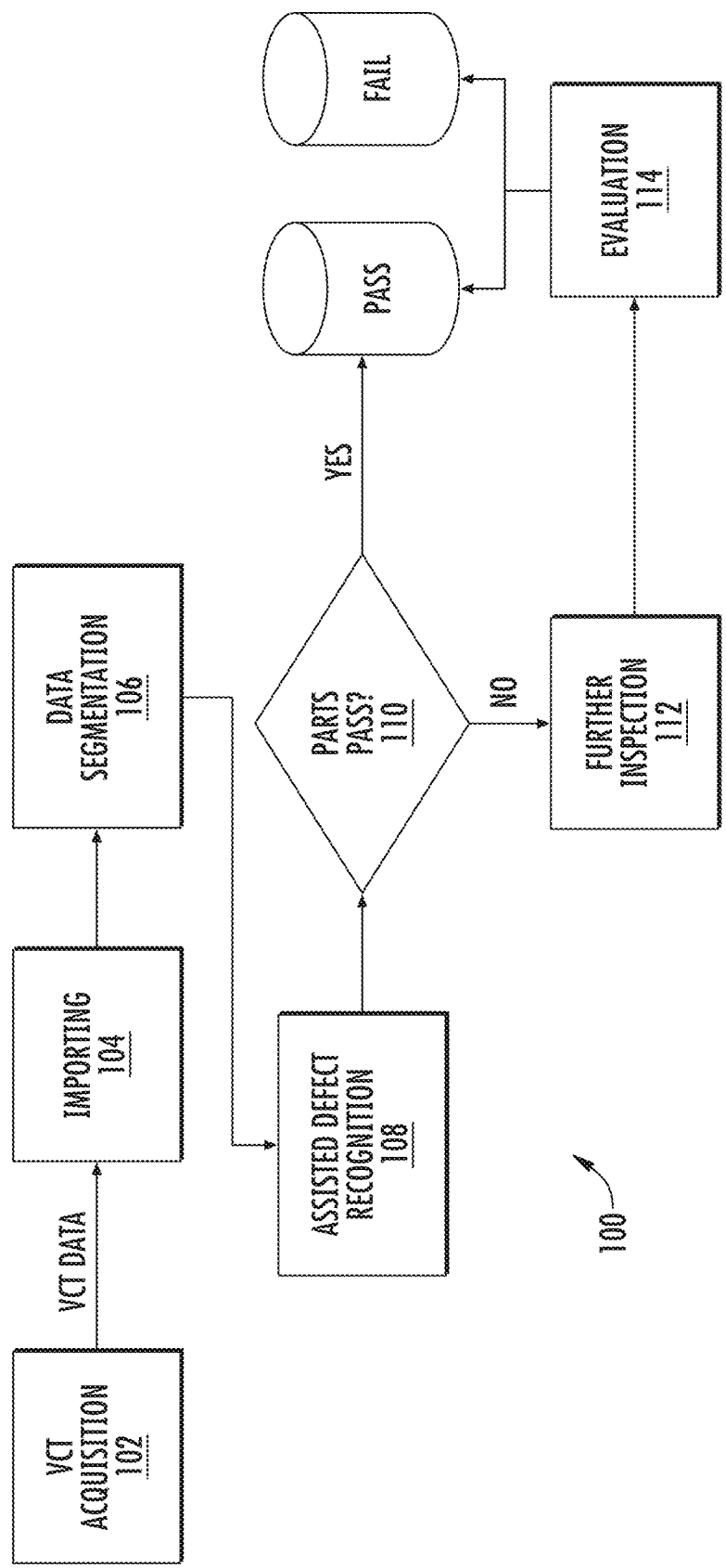
FIG. 1 is a flow chart showing operations of a VCT-based method for notifying an operator of an indication of a potential defect in a part, in accordance with various embodiments.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present disclosure is generally related to a system and method that may more accurately determine a porosity of a part. The system and method of the present disclosure does not rely solely on a resolution of the scan images to determine in a binary fashion if an individual pixel or voxel represents a void or a solid portion of the material. As will be appreciated from the description herein, particularly with lower resolution scanning systems, such may be problematic as the void may be much smaller than the area of influence of the pixel or voxel, such that any material actually present within the pixel or voxel around a void would not be taken into consideration. By contrast, the system of the present disclosure uses the average scan intensity within a region of interest to determine the porosity of the region of interest, allowing for more accurate porosity determinations even with lower resolution scanners.

For example, certain aspects of the present disclosure are related to a method for determining a porosity of a part. The method generally includes determining scan data of the part, the scan data including data of a plurality of sequential segments (e.g., a plurality of sequential pixels or voxels). For example, the method may use a 2D or 3D computed tomography image to determine scan data for a plurality of sequential pixels or voxels. The scan data may refer to a scan intensity or scan density for each individual pixel or voxel, which may be indicative of a density or a porosity of a portion of the part represented by that pixel or voxel, as well as a density or porosity of a portion of the part material surrounding the portion of the part represented by that pixel or voxel (e.g., the scan data for a particular pixel or voxel may be influenced by porosity in one or more surrounding pixels or voxels). In addition, the method may determine a background model for the part, the scan data, or both. In particular, the method may determine background data, which may be indicative of an anticipated density of the part at the plurality of sequential segments. For example, for a portion of the part intended to be solid, the background data may be representative of a portion of the part defining no porosity (e.g., less than 0.1% porosity) or substantially no porosity (e.g., less than 5% porosity, such as less than 2.5% porosity, such as less than 1% porosity). The background data may be determined at least in part using the scan data (e.g., through one or more assisted defect recognition algorithms). Additionally, or alternatively, the background data may be determined prior to determining the scan data based on an ideal or perfect part.

Optionally, the method may normalize the scan data across, e.g., the part or a portion of the part by subtracting out the background data. Such may ensure that a value of the normalized scan data is consistent relative to a common baseline across the part or the portion of the part, despite, e.g., differing manufacturing methods across the part, differing materials across the part, etc. With the normalized scan data, the method may further determine which areas of the part are below a threshold of porosity, such that it may be assumed such portion has a sufficiently low porosity. Such a step may further determine region(s) of interest where more specific analysis is needed to determine porosity.

Further, the method may, within one or more region(s) of interest, determine bulk porosity based on a difference between the scan data and the background model. For example, the method may utilize the scan data of the plurality of sequential segments, may utilize the background data from the background model, and then may determine data indicative of a signal to background ratio (or "SBR") relating the scan data to the background data. The signal to background ratio may be calculated by calculating a volume between the scan data and the background data using a Riemann sum. It will be appreciated, that as used in this context, the term "volume" does not refer to a physical volume and instead refers to a volume in CT space, defined by the three spatial dimensions plus the magnitude of the CT measurement signal at those locations. Further, the term "scan data" generically refers to data received as part of one or more scans in accordance with the present disclosure. The term "scan data" may refer to an energy level indicative of porosity determined or derived scanning the part. For example, the scan data may include data indicative of a density of the part at the plurality of sequential segments, and the background data may include data indicative of an anticipated density of the part at the plurality of sequential segments as determined by the background model.

Referring now to the drawings, wherein identical numerals indicate the same elements throughout the figures, FIG. 1 schematically depicts, at a relatively high level, an example computed tomography ("CT")-based method 100 for notifying a user of an indication of a potential defect in a part. In particular, for the embodiment shown, the method 100 is a volumetric computed tomography ("VCT")-based method 100. Various aspects of the method 100 will be depicted and described herein in more detail below.

At block 102, VCT data may be obtained, e.g., by feeding one or more parts through a VCT scanning system. The VCT scanning system may be any suitable VCT scanning system. For example, the VCT scanning system may utilize x-ray sources, x-ray tubes, x-ray detectors, etc. to generate a three-dimensional image of a part. For example, the VCT scanning system may use a fan beam x-ray source, which may be detected by a linear detector array, as the part is rotated relative to the x-ray source and detector array. Alternatively, the VCT scanning system may use a cone beam x-ray source, which may be detected by an area detector array, as the part is rotated relative to the x-ray source and detector array. With such configuration, the three-dimensional image may be formed of a plurality of two-dimensional images/slices of the part.

Alternatively, however, the method 100 may be a two-dimensional CT method, such that the method 100 may receive CT data including two-dimensional image(s) of the part at block 102 (e.g., using a cone beam x-ray source).

At block 104, the VCT data may be imported into a database or other memory accessible by a computing system (e.g., computing system 400 of FIG. 9) configured with selected aspects of the present disclosure. At block 106, the imported data may be segmented, e.g., by part if multiple parts are scanned and/or by sub-part. For example, data associated with a 3D volume may be segregated or otherwise distinguished from data representing volumes of other parts. In some embodiments, a connected volume may be selected, extracted, and auto-cropped.

At block 108, a background model for the part is determined. More specifically, for the embodiment shown, determining the background model includes determining the background model using the scan data. More specifically, still, determining the background model includes utilizing an assisted defect recognition (ADR) process. In various embodiments, ADR may include normalizing voxels of a 3D volume to itself, denoising the volume using various techniques, and using techniques such as region growing to detect and/or classify indications of potential defects. At block 110, it may be determined based on the analysis performed at block 108 whether the part under examination satisfies a predetermined criterion. If the answer is yes (e.g., the part shows no indications of potential defects such as low porosity), then an indication that the part passed may be stored, e.g., in a "pass" database.

If the answer at block 110 is no, on the other hand, then the area may be labeled a "region of interest" and at block 112 further inspection may be initiated so that further review of the part may be completed to determine whether the part truly fails, or whether the automatically perceived indication is minor enough that the part should pass. In at least certain instances, at block 112, metadata about porosity levels, local porosity levels, location, part zone, etc. may be provided to the operator to evaluate along with the scan data.

At block 114, based on data provided at block 112, the method 100 may determine whether the part should pass (e.g., the indication is not of a critical nature or is an artifact of the scan data) or if it should fail using one or more inspection methods, such as method 200 described below. The result of the evaluation at block 114 may be provided to the pass database and/or the fail database.

It will be appreciated, however, that the CT-based inspection method 100 of FIG. 1 is provided by way of example only, and in other exemplary aspects, any other suitable inspection method may be utilized.

Figure 2:
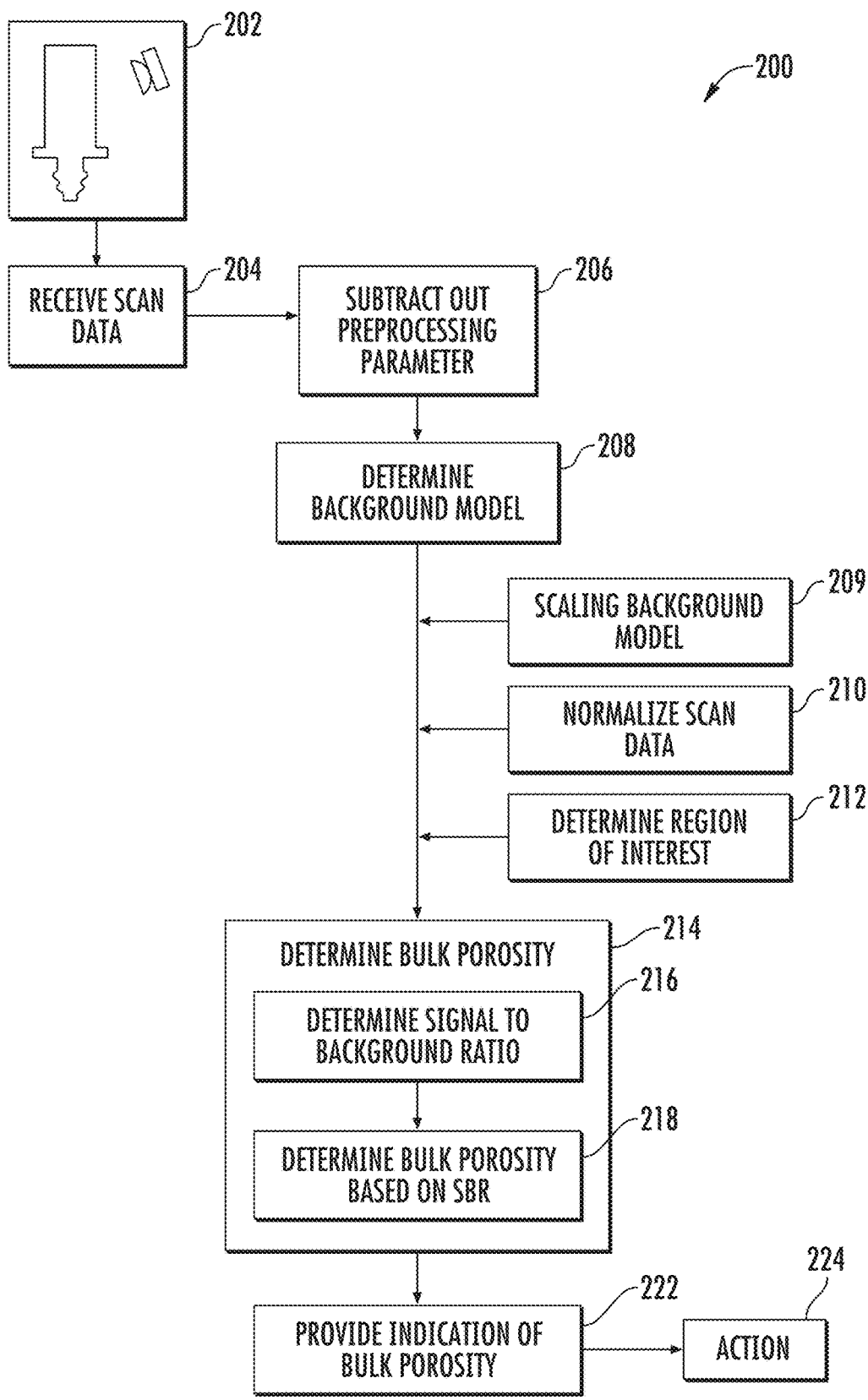
FIG. 2 is a flow chart for calculating porosity of a part in accordance with an exemplary aspect of the present disclosure.

Referring now to FIG. 2, a flow diagram of a method 200 for determining a bulk porosity of a part, or of a region of a part (e.g., a region of interest), is provided. The method 200 depicted in FIG. 2 may be incorporated into the method 100 of FIG. 1, for example as the detection at block 108. Additionally, or alternatively, however, the method 200 depicted in FIG. 2 may be utilized with or otherwise incorporated into any other suitable method and/or system for determining information about a part.

As is depicted schematically in FIG. 2, the method 200 includes determining scan data of the part. In particular, the method 200 includes at (202) operating a CT or VCT scanning machine to scan the part (using a CT process or VCT process). For the embodiment shown, the part is a composite part. The term "composite" as used herein may be defined as a material containing a reinforcement such as fibers or particles supported in a binder or matrix material. Composite materials include metallic and non-metallic composites. One embodiment for a composite part is made of a unidirectional tape material and an epoxy resin matrix. The composite parts may include composite materials of the non-metallic type made of a material containing a fiber such as a carbonaceous, silica, metal, metal oxide, or ceramic fiber embedded in a resin material such as Epoxy, PMR15, BMI, PEED, etc. A more particular material includes fibers unidirectionally aligned into a tape that is impregnated with a resin, formed into a part shape, and cured via an autoclaving process or press molding to form a light-weight, stiff, relatively homogeneous article having laminates within. However, these are only meant as non-limiting examples.

In certain embodiments the composite part may be a composite part for gas turbine engine. In particular, for the embodiment shown, the part is a composite airfoil for a gas turbine engine, such as a fan blade, a compressor rotor blade, a turbine rotor blade, a stator vane, a guide vane, or the like. It will be appreciated, however, that in other exemplary embodiments, aspects of the present disclosure may be utilized with any other suitable part for gas turbine engine, such as one or more of a shroud, a liner, a dome, etc. Further, although described as being utilized with a composite part, in other embodiments, aspects of the present disclosure may be utilized with a part formed of any other suitable material capable of being scanned with a CT scanning machine or VCT scanning machine. For example, in other exemplary aspects, the systems and processes described herein may be used to find porosities in any other materials, such as metals and metal alloys.

Figure 3:
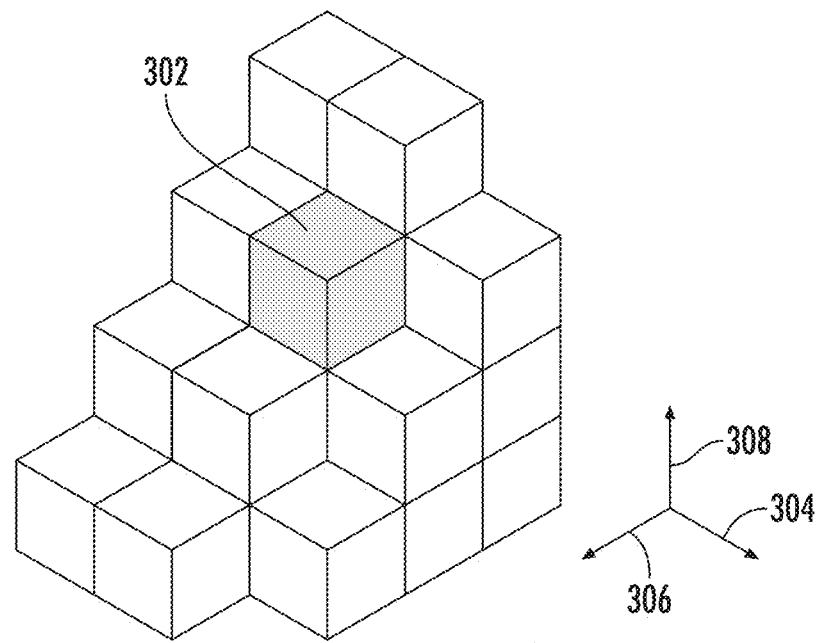
FIG. 3 is an array of voxels in accordance with an exemplary aspect of the present disclosure.

In addition, as part of determining the scan data for the part, the method 200 further includes at (204) receiving scan data. As will be appreciated, the scan data received at (204) may include data of a plurality of sequential segments. The plurality of sequential segments may be a plurality of sequential pixels or voxels. For example, in the case of a method utilizing a two-dimensional CT scanning system, the plurality sequential segments may be a plurality of sequential pixels. By contrast, in the case of a method utilizing a three-dimensional CT or VCT scanning system, the plurality of sequential segments may be a plurality of sequential voxels. For example, referring briefly to FIG. 3, providing a perspective, schematic view of a plurality of voxels 302, it will be appreciated that the plurality of sequential voxels 302 may be a plurality of voxels extending along an x-axis 304, extending along a y-axis 306, extending along a z-axis 308, or extending along any other vector.

Moreover, it will be appreciated that the data received at (204) may generally be indicative of a porosity of each segment of the plurality of sequential segments. For example, the data of the plurality of sequential segments may include data indicative of porosity in each segment of the plurality of sequential segments. For example, the data of the plurality of sequential segments may include data indicative of a scan intensity at each segment of the plurality of sequential segments, such as data indicative of a scanned density at such segment of the plurality of sequential segments.

Notably, it will be appreciated from the description herein that the data indicative of the porosity of the segment may be influenced by porosity in one or more surrounding segments, including the immediately adjacent segments and/or other nearby segments. For example, referring now briefly to FIGS. 4 and 5, scan data of a first segment 310 and a second segment 312, respectively, are provided in accordance with exemplary aspects of the present disclosure for explanation purposes. The segments 310, 312 are shown as pixels (i.e., 2-dimensional images) for explanation purposes, but the same rationale equally applies to three-dimensional segments/voxels.

Figure 4:
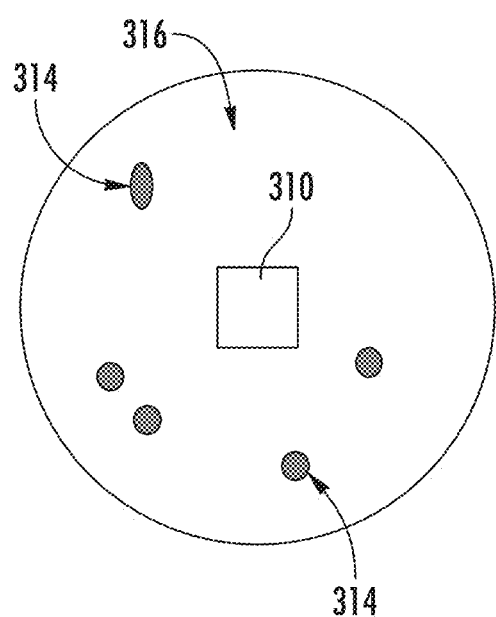
FIG. 4 is a pixel and surrounding area of influence for the pixel in accordance with the present disclosure.
Figure 5:
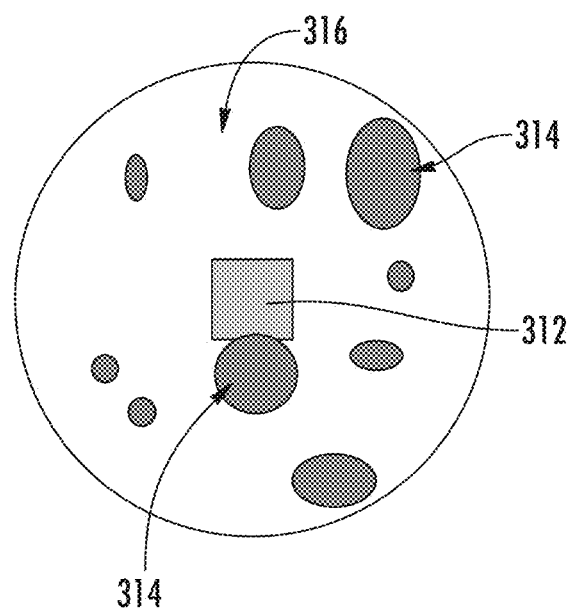
FIG. 5 is a pixel and surrounding area of influence for the pixel in accordance with another embodiment of the present disclosure.

In particular, each of FIGS. 4 and 5 depict graphically the scan data from the segments 310, 312 resulting from the scan of a part, with the part defining one or more pores, or voids, 314. The intensity of the scan data, generally representing density of the scanned part, returned as part of the scan at the segments 310, 312 is affected by the one or more voids in the segments adjacent to region represented by the segments 310, 312, referred to herein as a surrounding region 316. For example, referring specifically to FIG. 4, the region represented by the depicted segment 310 has no pores 314, but the segment 310 representing such region still indicates some level of porosity by virtue of the segment 310 not being perfectly white, and instead being a light gray on a grayscale. Such is a result of the pores 314 included in the surrounding region 316. By contrast, referring specifically to FIG. 5, the region represented by the depicted segment 312 includes a pore 314 partially in the segment 312, and the surrounding region 316 of the segment 312 further includes a plurality of pores 314. As such, the segment 312 representing the region in FIG. 5 is a darker gray on the grayscale.

As will be appreciated from the description herein, the value of the data for a particular segment, and the influence of the pores 314 in the region represented by a particular segment and the respective surrounding region, may incorporate a point spread function response to the pores 314 in the segment and the surrounding region 316.

Referring back specifically to FIG. 2, after receiving the scan data at (204), the method 200 further includes at (206) subtracting out a preprocessing parameter from the scan data received at (204). The preprocessing parameter may be a bias, such as a constant bias. The constant bias may be the mean of the air signals in the scan data received at (204) relative to the actual part. For example, in a completely porous part it would never really show as 100% void as there is at least some mass in the air that is detected in the void, as well as in the air between the part and the scanners.

Figure 6:
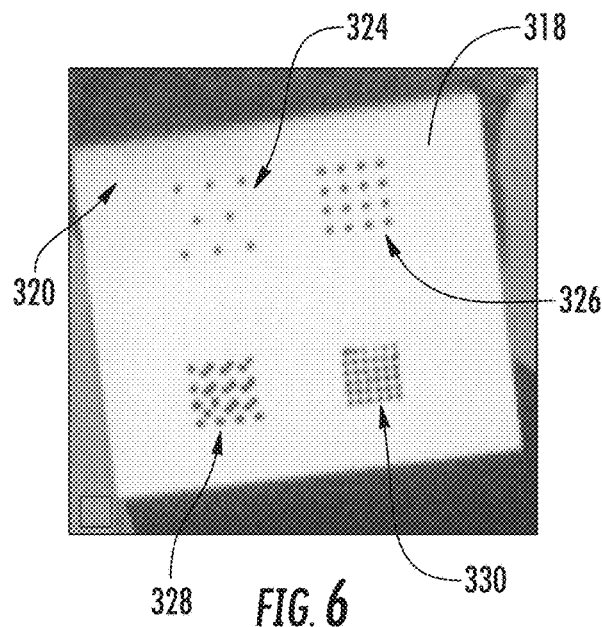
FIG. 6 is a high-resolution image from a high-resolution CT scanner in accordance with an embodiment of the present disclosure.
Figure 7:
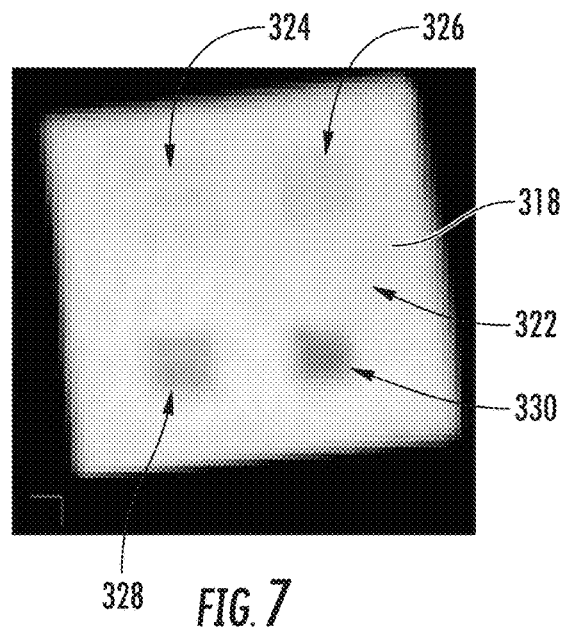
FIG. 7 is a low resolution image from a low resolution CT scanner in accordance with an embodiment of the present disclosure.

The constant bias may be information specific to the part, information specific to the CT scanner/VCT scanner, or both. For example, referring now briefly to FIGS. 6 and 7, sample images of a part taken from a CT scanner are shown. The image shown in FIG. 6 is a high-resolution image of a sample part 318 from a high-resolution CT scanner, and the image shown in FIG. 7 is a low resolution image of the sample part 318 from a low resolution CT scanner. Notably, each of the images in FIG. 6 and in FIG. 7 is of the same cross-section of the same sample part 318. It will be appreciated, that as used herein, the terms "high" and "low" with respect to the resolution of the images in FIGS. 6 and 7 are relative terms, and do not require or imply any absolute resolution.

As shown in FIG. 6, the image includes a shade of darkness 320 over some portions of the part, and in particular, over the top left corner of the part. Similarly, as shown in FIG. 7, the image includes a shade of darkness 322 over some portions of the part, and in particular, over the middle right portion of the part. While the sample part 318 depicted in each of these images does include areas of porosity (e.g., porosity regions 324, 326, 328, 330), the areas of darkness 320, 322 noted above do not necessarily indicate additional porosity within the part. Instead the areas of darkness 320, 322 noted above are artifacts of, e.g., the scanner, the material being scanned, beam hardening, scatter, partial volume effects, etc. Accordingly, the method 200 depicted at (206) takes into account these areas of darkness 320, 322 to ensure it does not affect the accuracy of the porosity determinations described below.

As such, it will be appreciated that the preprocessing parameter subtracted out at (204) may additionally or alternatively refer generally to any other suitable preprocessing parameter that may be useful. For example, the preprocessing parameter may refer to a linear bias correction (which may be required for some CT scanners), an image registration, an image transformations, or the like.

The preprocessing parameter utilized to process images may be determined through empirical data bias information for the part, for the scanner, or both (e.g., to accommodate artifacts from the scanner, the part, environmental conditions, etc.). For example, the method 200 may scan and analyze one or more parts having a known porosity, and may determine the constant bias based on the known porosity.

Referring now back to FIG. 2, the method 200 further includes at (208) determining a background model for the part, the scan data, or both. The background model determined at (208) may be an anticipated value of scan data of the part over regions that define no, or substantially no, porosity. For example, the background model determined at (208) may be a baseline scan intensity representing density within the part for a region of the part defining no or substantially no porosity. For example, if the same grayscale shown in FIGS. 4 and 5 is indicative of the scan data utilized by the method 200, the background model for the part determined at (208) may be a value indicative of a very light gray or white end of the grayscale.

In certain exemplary embodiments, determining the background model at (208) may include determining the background model at least in part using the scan data received at (204), with the preprocessing parameter subtracted out at (206). More specifically, still, determining the background model at (208) may include utilizing an assisted defect recognition (ADR) process, as discussed in more detail above. In such a manner, the background model may take into account variations in manufacturing and the like.

However, in other exemplary aspect, determining the background model for the part, the scan data, or both (208) may include utilizing data saved in a memory associated with the part, with the scanner, or both. For example, the background model for the part may be based on an ideal or nearly perfect part that is anticipated to contain little to no unintended porosity.

Further, it will be appreciated that for the exemplary aspect depicted, the method includes at (209) scaling the background model. More specifically, it will be appreciated that the step of determining the background model at (208), when determined using the scan data, in effect fills in all the air and voids within the model of the scanned part to obtain what should be a complete and non-porous part. As will be appreciated from the discussion below, determining porosity according to the present method may include using an average of background data from the background model, e.g., at a particular region of interest. Further, since the average of the background data is based on the background model with all the voids filled in, the average of the background data may be different than what the true average should be for the part. Accordingly, the method of FIG. 2 may scale the background model at (209) to account for this difference. Scaling the background model at (209) may include applying a transfer function to the background data of the background model, the transfer function applying an energy adjustment to the background data (e.g., multiplying the values of the background data by an energy adjustment factor) such that the background data more closely matches the desired average scan data for the part.

In the exemplary aspect depicted, the method further includes at (210) normalizing the scan data received at (204) across, e.g., the part or a portion of the part. Normalizing the scan data at (204) may include subtracting out background data of the background model for the part or the portion of the part. The normalized scan data may therefore be indicative of porosity of the part, independent of certain underlying characteristics of the part, such as the material forming that portion of the part, the manufacturing method for that portion of the part, etc. Such a configuration may enable a consistent analysis of the part, or rather of the normalized scan data of the part, independent of said certain underlying characteristics of the part.

Referring still to FIG. 2, the method may further include at (212) determining one or more regions of interest based on the normalized scan data determined at (210). In particular, at (212) the method may determine portions of the data that are below porosity thresholds indicating a baseline confidence in said portions being sufficiently non-porous. Utilizing the normalized scan data for such determinations may facilitate a consistent analysis across the part. The determined region(s) of interest may be areas where more specific analysis is needed to determine porosity.

The method of FIG. 2 further includes at (214) determining a bulk porosity of the part. More specifically, for the exemplary aspect depicted in FIG. 2, determining the bulk porosity of the part at (214) generally includes determining the bulk porosity based on a difference between the scan data received at (204) (and optionally modified based on the preprocessing parameter at (206)) and the background model determined at (208).

Referring still to the method of FIG. 2, determining the bulk porosity of the part at (214) may generally include determining the bulk porosity of the part at a particular region of interest determined at (212), such that the difference between the scan data received at (204) and the background model determined at (208) is indicative of the bulk porosity at the region of interest determined at (212).

In particular, for the exemplary aspect shown, determining the bulk porosity at (214) includes at (216) determining data indicative of a signal to background ratio relating the scan data to the background data, utilizing the scan data of the plurality of sequential segments and the background data of the background model. The term "scan data" may refer to data determined or derived from the scan of the part.

Determining the data indicative of the signal to background ratio at (216) may include calculating a volume between the scan data and the background data using a Riemann sum. In this context, the term "volume" refers to a volume in CT space, defined by the three spatial dimensions plus the magnitude of the CT measurement signal at those locations.

Figure 8:
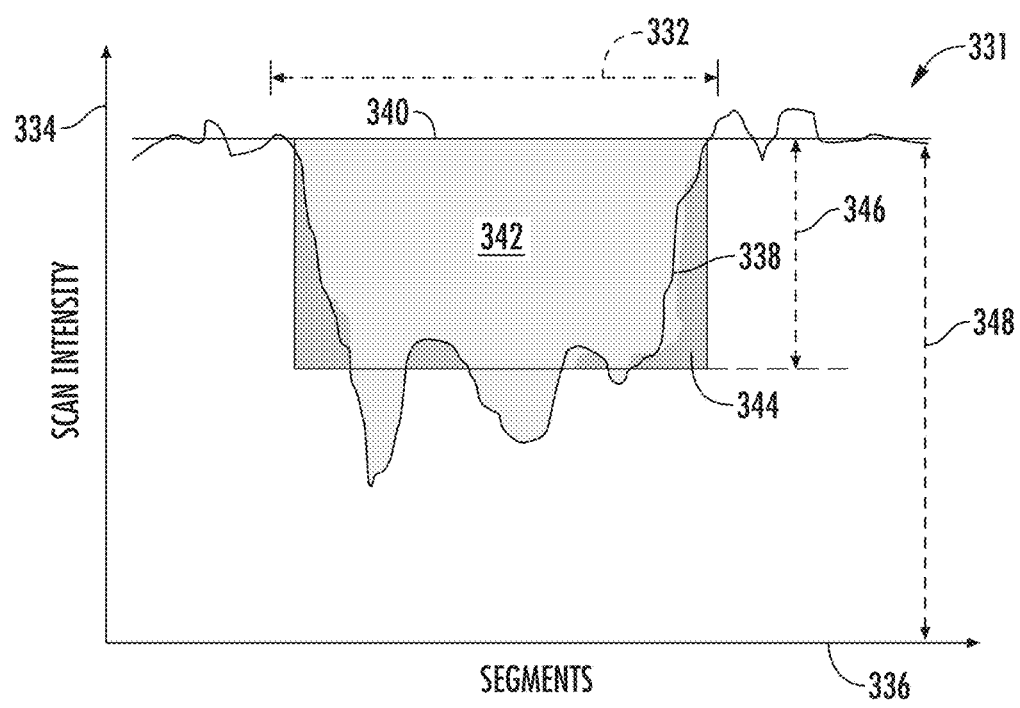
FIG. 8 is a graph of a region of interest of a part, with scan intensity being represented by the y-axis and sequential segments of the part represented by the x-axis.

For example, referring now to FIG. 8, a graph 331 is shown of a region of interest 332 of a part, with scan intensity being represented along a y-axis 334 and sequential segments of the part represented along an x-axis 336. The scan data received at (204) (see FIG. 2) is represented in the graph 331 as a signal line 338, the signal line 338 indicating the scan intensity at each segment of the plurality of sequential segments of the part. The background model is also plotted in the graph at a reference line 340. Although depicted as a straight line in FIG. 8, the background model may instead vary for a variety of reasons, such as various artifacts within the part. Further, although only two dimensions are depicted in FIG. 8 for clarity (x-axis 336 and y-axis 334), it will be appreciated that in determining the signal to background ratio, there may further be a third dimension along a z-axis similarly representing sequential segments of the part (hence the reference to volume). Moreover, although the scan data and background data are depicted graphically in the graph 331 in FIG. 8, in determining the signal to background ratio, the method may not graph the data, and instead may determine the "volume" through various algorithms using the data without plotting the data.

As will be appreciated from the discussion herein, for example from the discussion above with reference to FIGS. 4 and 5, the scan data for each individual segment is influenced by porosity within the portion of the part represented by that individual segment (e.g., the pixel or voxel), as well as by porosity in the portions of the part represented by the segments surrounding the individual segment (see, e.g., discussion above with reference to FIGS. 4 and 5). In such a manner, it will be appreciated that the signal to background ratio, represented by a volume between the reference line 340 and the signal line 338, may represent or otherwise be indicative of average porosities for the part at the segments within the region of interest 332. In such a manner, although the segments (e.g., the pixels or voxels) may be larger than the individual pores within the segments, particularly with a low-resolution scanner, reviewing the region of interest as a whole may provide a more accurate representation of the overall porosity/bulk porosity for the region of interest 332 of the part.

More specifically, for the exemplary aspect shown and with reference back to FIG. 2, determining the bulk porosity at (210) further includes, as noted above, at (216) determining data indicative of the signal to background ratio relating the scan data (represented by, e.g., the signal line 338) to the background data (represented by the reference line 340). The signal to background ratio may be visualized as calculating a volume 342 between the scan data along the signal line 338 and the plotted background model along the reference line 340 within the region of interest 332 (and, e.g., further extending in the z direction), divided by the volume under the plotted background model along the reference line 340. In such a manner, it will more specifically be appreciated that the signal to background ratio refers to a difference between the scan data and background data, divided by the background data, within a particular region of interest 332.

Further, determining the bulk porosity of the part at (214) includes at (218) determining bulk porosity for the part based on the signal to background ratio (represented by the volume 342). For example, the signal to background ratio within the region of interest 332 (represented by the volume 342 between the plotted scan data and the plotted background model divided by the plotted background model within the region of interest 332) may be indicative of the bulk porosity of the region of interest 332, and a transfer function may be utilized to convert the signal to background ratio within the region of interest 332 to a bulk porosity reading for the region of interest 332.

In certain exemplary aspects, calculating the volume 342 between the plotted scan data and the plotted background model, as noted above, may include using a Riemann sum to measure the volume between the plotted scan data along the signal line 338 and the plotted background model along the reference line 340 (represented by the volume 342 in FIG. 8).

Additionally, or alternatively, other means or methods may be used to determine the volume between the signal line 338 and the reference line 340 within a region of interest 332.

The volume between the signal line 338 and the reference line 340 may be represented by a rectangle 344, having a height 346 representing the average signal level within the area of interest 332 along the y-axis 334 relative to the average background data/reference line 340 and a width (which corresponds to the region of interest 332 in FIG. 8) along the x-axis 336 of the rectangle 344. More specifically, still, the signal to background ratio may correlate to a comparison of a volume having the height 346, width 332, and a depth (not depicted) to a volume under the reference line 340 (having the same width 332 and depth (not depicted)), divided by the volume under the reference line 340. The signal to background ratio for a particular region of interest 332 may be indicative of the bulk porosity for the region of interest 332.

In such a manner, it will be appreciated that the signal to background ratio within a particular region may be determined by either (a) determining the signal to background ratio on a segment-by-segment basis or (b) determining the signal to background ratio on an average basis for a region of interest. With option (a) the signal to background ratio may be determined by subtracting the scan data from the background data and dividing by the background data at each segment (e.g., (the value at the reference line 340–the value at the signal line 338)/(the value at the reference line 340)). The signal to background ratio data for each segment may then be averaged across a region of interest to get the signal to background ratio for the region of interest. By contrast, with option (B), the signal to background ratio may be determined by subtracting average scan data across a region of interest from average background data for the region of interest, divided by the average background data for the region of interest (e.g., (height 346/height 348)).

Moreover, it will be appreciated that in at least certain exemplary embodiments, the size of the region of interest may be as large or as small as desired. For example, in certain exemplary embodiments, the region of interest may correspond to a single segment (e.g., a single pixel or a single voxel). Alternatively, the region of interest may relate to a larger portion of the part (e.g., at least 1% by volume of the part, such as at least 2%, such as at least 5%, and up to, e.g., 100% (for a relatively small part), such as up to 70%, such as up to 50%, such as up to 30%, such as up to 20%, such as up to 10%).

Further with respect to FIG. 2, it will be appreciated that the method 200 may additionally be utilized to tune the background model noted at (208), the preprocessing parameter noted at (206), or both. In particular, the method 200 may provide information at (220) indicative of the bulk porosity determined at (218), the volume calculated (216), etc. to the background model and/or preprocessing parameter to allow the background model and/or preprocessing parameter to update and/or calibrate. Such may allow for the method 200 to account for different scan parameters or different part geometries that may correlate with true porosity differently under those scan parameters (e.g. voltage, current, integration time, filtering, etc.).

Moreover, it will be appreciated that the method 200 may further provide a visualization of the bulk porosity to a user at (222) based on the determined bulk porosity at (218). The visualization may be of an actual bulk porosity for a region of interest, or may be a "pass"/"fail" indication (such as a green light or red light). The results may be provided to a database which is later provided to the user. Any other indicator may additionally or alternatively be provided.

Further, still, the method 200 may further initiate an action based on the bulk porosity at (224). The action may be to clear the part for use (i.e., indicate that it has a porosity below a minimum threshold or some other threshold), or may be to remove the part from use (e.g., sale, distribution, installation, circulation, etc.) in the event the porosity is above a threshold and either discard. Additionally or alternatively still, the action may be to downgrade the quality of the part based on the bulk porosity determined at (218). The actions may be similar to the "Pass"/"Fail" actions described above with respect to FIG. 1.

Figure 9:
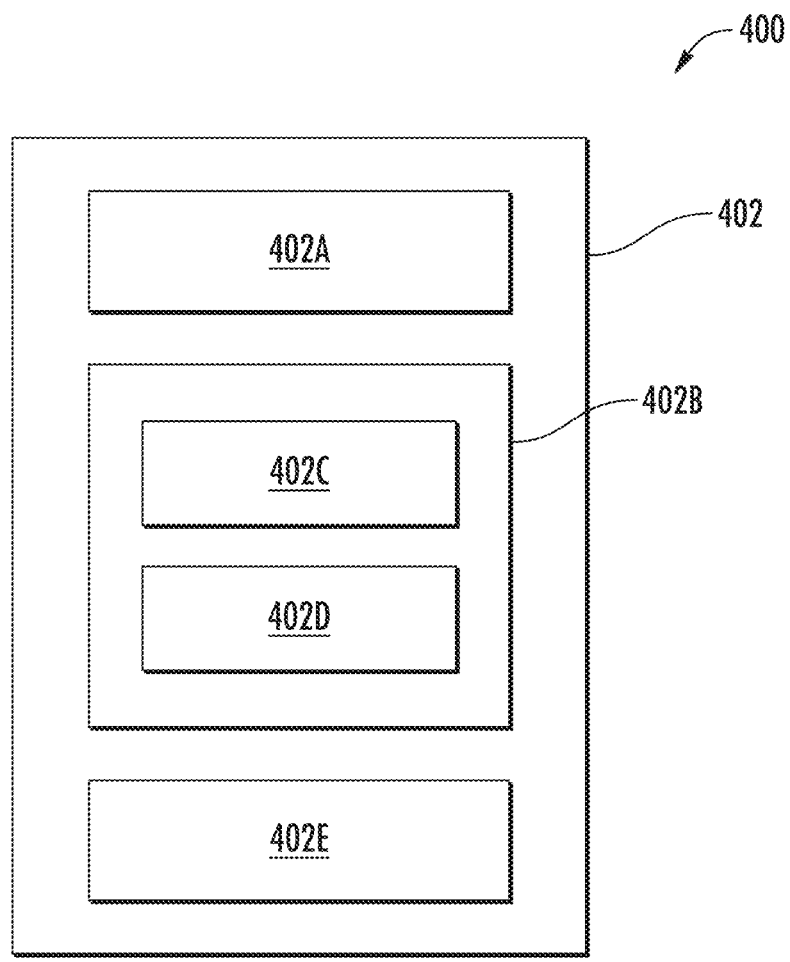
FIG. 9 is a computing system in accordance with an exemplary aspect of the present disclosure.

Referring now to FIG. 9, a schematic view of a computing system 400 in accordance with an exemplary aspect of the present disclosure is provided. The exemplary computing system 400 of FIG. 9 may be configured to receive scan data from the one or more scanners, such as one or more CT/VCT scanners and, e.g., may make decisions based on the received data.

In one or more exemplary embodiments, the computing system 400 depicted in FIG. 9 may be a stand-alone computing system 400 or alternatively may be integrated into one or more other computing systems.

Referring particularly to the operation of the computing system 400, in at least certain embodiments, the computing system 400 can include one or more computing device(s) 402. The computing device(s) 402 can include one or more processor(s) 402A and one or more memory device(s) 402B. The one or more processor(s) 402A can include any suitable processing device, such as a microprocessor, microcontroller, integrated circuit, logic device, and/or other suitable processing device. The one or more memory device(s) 402B can include one or more computer-readable media, including, but not limited to, non-transitory computer-readable media, RAM, ROM, hard drives, flash drives, and/or other memory devices.

The one or more memory device(s) 402B can store information accessible by the one or more processor(s) 402A, including computer-readable instructions 402C that can be executed by the one or more processor(s) 402A. The instructions 402C can be any set of instructions that when executed by the one or more processor(s) 402A, cause the one or more processor(s) 402A to perform operations. In some embodiments, the instructions 402C can be executed by the one or more processor(s) 402A to cause the one or more processor(s) 402A to perform operations, such as any of the operations and functions for which the computing system 400 and/or the computing device(s) 402 are configured, the operations for operating a porosity system (e.g., methods 100, 200), as described herein, and/or any other operations or functions of the one or more computing device(s) 402. The instructions 402C can be software written in any suitable programming language or can be implemented in hardware. Additionally, and/or alternatively, the instructions 402C can be executed in logically and/or virtually separate threads on the one or more processor(s) 402A. The one or more memory device(s) 402B can further store data 402D that can be accessed by the one or more processor(s) 402A. For example, the data 402D can include data indicative of power flows, data indicative of engine/aircraft operating conditions, and/or any other data and/or information described herein.

The computing device(s) 402 can also include a network interface 402E used to communicate, for example, with the other components. The network interface 402E can include any suitable components for interfacing with one or more network(s), including for example, transmitters, receivers, ports, controllers, antennas, and/or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A method for determining porosity of a part comprising: determining scan data of the part, the scan data comprising data of a plurality of sequential segments; determining a background model for the part, the scan data, or both; and determining a bulk porosity based on a difference between the scan data and the background model.

The method of one or more of these clauses, wherein determining scan data of the part comprises determining scan data within a region of interest based on the scan data of the plurality of sequential segments, wherein determining the background model for the part, the scan data, or both comprises determining background data within the region of interest based on the background model, and wherein determining the bulk porosity based on the difference between the scan data and the background model comprises determining data indicative of a signal to background ratio within the region of interest relating the scan data to the background data.

The method of one or more of these clauses, wherein determining data indicative of the signal to background ratio comprises calculating a volume between the scan data and the background data using a Riemann sum.

The method of one or more of these clauses, wherein determining data indicative of the signal to background ratio comprises determining an average signal level.

The method of one or more of these clauses, wherein the scan data comprises data indicative of a density of the part at the plurality of sequential segments, and wherein the background data comprises data indicative of an anticipated density of the part at the plurality of sequential segments.

The method of one or more of these clauses, wherein the scan data comprises data indicative of a density of the part at the plurality of sequential segments, wherein the plurality of sequential segments is a plurality of pixels or voxels, and wherein the data indicative of the density of each pixel or voxel is influenced by a porosity in one or more surrounding pixels or voxels.

The method of one or more of these clauses, wherein determining scan data of the part comprises scanning the part using a computed tomography process.

The method of one or more of these clauses, wherein the computed tomography process is a volumetric computed tomography process.

The method of one or more of these clauses, wherein the data of the plurality of sequential segments comprises data indicative of porosity in each segment of the plurality of sequential segments.

The method of one or more of these clauses, wherein each segment of the plurality of sequential segments is a pixel or voxel.

The method of one or more of these clauses, wherein the part is a composite part or a metal part for a gas turbine engine.

The method of one or more of these clauses, wherein determining the scan data of the part comprises receiving the scan data and subtracting out a preprocessing parameter from the scan data.

The method of one or more of these clauses, further comprising: providing an indication of the determined bulk porosity to a user.

The method of one or more of these clauses, further comprising: initiating an action based on the determined bulk porosity.

The method of one or more of these clauses, wherein determining the background model for the part, the scan data, or both comprises determining the background model for the part based on the scan data.

The method of one or more of these clauses, wherein determining the background model for the part, the scan data, or both comprises determining the background model for the part based on a pre-scanned part.

A system for determining a porosity of a part, the system comprising: one or more processors; and memory operably coupled to the one or more processors, the memory containing instructions that, in response to execution of the instructions by the one or more processors, cause the one or more processors to: determine scan data of the part, the scan data comprising data of a plurality of sequential segments; determine a background model for the part, the scan data, or both; and determine a bulk porosity based on a difference between the scan data and the background model.

The system of one or more of these clauses, wherein determining scan data of the part comprises scanning the part using a volumetric computed tomography process.

The system of one or more of these clauses, wherein determining scan data of the part comprises determining scan data within a region of interest based on the scan data of the plurality of sequential segments, wherein determining the background model for the part, the scan data, or both comprises determining background data within the region of interest based on the background model, and wherein determining the bulk porosity based on the difference between the scan data and the background model comprises determining data indicative of a signal to background ratio within the region of interest relating the scan data to the background data.

The system of one or more of these clauses, wherein calculating the signal to background ratio comprises calculating a volume between the scan data and the background data within the region of interest using a Riemann sum.

A method of one or more of these clauses using a system of one or more of these clauses.

A system of one or more of these clauses using a method of one or more of these clauses.

We claim:

1. A method for determining porosity of a part comprising:
    determining scan data of the part, the scan data comprising data of a plurality of sequential segments, wherein determining scan data of the part comprises determining scan data within a region of interest based on the scan data of the plurality of sequential segments;
    determining a background model for the part, the scan data, or both, wherein determining the background model for the part, the scan data, or both comprises determining background data within the region of interest based on the background model; and
    determining a bulk porosity based on a difference between the scan data and the background model, wherein determining the bulk porosity based on the difference between the scan data and the background model comprises determining data indicative of a signal to background ratio within the region of interest relating the scan data to the background data.

2. The method of claim 1, wherein determining data indicative of the signal to background ratio comprises determining data indicative of the signal to background ratio based on a difference between the scan data and the background data.

3. The method of claim 1, wherein determining data indicative of the signal to background ratio comprises calculating a volume between the scan data and the background data using a Riemann sum.

4. The method of claim 1, wherein determining data indicative of the signal to background ratio comprises determining an average signal level.

5. The method of claim 1, wherein the scan data comprises data indicative of a density of the part at the plurality of sequential segments, and wherein the background data comprises data indicative of an anticipated density of the part at the plurality of sequential segments.

6. The method of claim 1, wherein the scan data comprises data indicative of a density of the part at the plurality of sequential segments, wherein the plurality of sequential segments is a plurality of pixels or voxels, and wherein the data indicative of a density of each pixel or voxel is influenced by a porosity in one or more surrounding pixels or voxels.

7. The method of claim 1, wherein determining scan data of the part comprises scanning the part using a computed tomography process.

8. The method of claim 7, wherein the computed tomography process is a volumetric computed tomography process.

9. The method of claim 1, wherein the data of the plurality of sequential segments comprises data indicative of porosity in each segment of the plurality of sequential segments.

10. The method of claim 1, wherein each segment of the plurality of sequential segments is a pixel or voxel.

11. The method of claim 1, wherein the part is a composite part or a metal part for a gas turbine engine.

12. The method of claim 1, wherein determining the scan data of the part comprises receiving the scan data and subtracting out a preprocessing parameter from the scan data.

13. The method of claim 1, further comprising:
providing an indication of the determined bulk porosity to a user.

14. The method of claim 1, further comprising:
initiating an action based on the determined bulk porosity.

15. The method of claim 1, wherein determining the background model for the part, the scan data, or both comprises determining the background model for the part based on the scan data.

16. The method of claim 1, wherein determining the background model for the part, the scan data, or both comprises determining the background model for the part based on a pre-scanned part.

17. A system for determining a porosity of a part, the system comprising:
one or more processors; and
memory operably coupled to the one or more processors, the memory containing instructions that, in response to execution of the instructions by the one or more processors, cause the one or more processors to:
determine scan data of the part, the scan data comprising data of a plurality of sequential segments, wherein determining scan data of the part comprises determining scan data within a region of interest based on the scan data of the plurality of sequential segments;
determine a background model for the part, the scan data, or both, wherein determining the background model for the part, the scan data, or both comprises determining background data within the region of interest based on the background model; and
determine a bulk porosity based on a difference between the scan data and the background model, wherein determining the bulk porosity based on the difference between the scan data and the background model comprises determining data indicative of a signal to background ratio within the region of interest relating the scan data to the background data.

18. The system of claim 17, wherein determining scan data of the part comprises scanning the part using a volumetric computed tomography process.

19. The system of claim 17, wherein determining data indicative of the signal to background ratio comprises determining data indicative of the signal to background ratio based on a difference between the scan data and the background data.

20. The system of claim 17, wherein calculating the signal to background ratio comprises calculating a volume between the scan data and the background data within the region of interest using a Riemann sum.

* * * * *